(12) United States Patent
Dagher et al.

(10) Patent No.: US 8,935,888 B2
(45) Date of Patent: Jan. 20, 2015

(54) COMPOSITE STRUCTURAL MEMBER

(71) Applicant: University of Maine System Board of Trustees, Bangor, ME (US)

(72) Inventors: Habib J. Dagher, Veazie, ME (US); Richard F. Nye, Old Town, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 14/016,780

(22) Filed: Sep. 3, 2013

(65) Prior Publication Data

US 2014/0069024 A1 Mar. 13, 2014

Related U.S. Application Data

(63) Continuation of application No. 12/891,032, filed on Sep. 27, 2010, now Pat. No. 8,522,486, which is a continuation-in-part of application No. 11/642,240, filed on Dec. 19, 2006, now Pat. No. 7,811,495, said application No. 12/891,032 is a continuation-in-part of application No. 11/043,420, filed on Jan. 26, 2005, now Pat. No. 8,850,750.

(60) Provisional application No. 60/752,233, filed on Dec. 20, 2005.

(51) Int. Cl.
*E04G 11/04* (2006.01)
*B29C 33/50* (2006.01)
*B29C 70/44* (2006.01)
*B29C 70/56* (2006.01)
*B29C 70/86* (2006.01)
*B29C 33/38* (2006.01)
*B29K 709/06* (2006.01)

(52) U.S. Cl.
CPC ............ *E04G 11/045* (2013.01); *B29C 33/505* (2013.01); *B29C 70/443* (2013.01); *B29C 70/446* (2013.01); *B29C 70/56* (2013.01); *B29C 70/865* (2013.01); *B29C 33/38* (2013.01); *B29K 2709/06* (2013.01)
USPC .................................. 52/2.15; 52/2.13; 52/86

(58) Field of Classification Search
CPC . E04G 11/04; E04B 1/169; E04B 2001/3264; E04B 2001/3217; E04H 15/20; B29C 33/38; B29C 33/505; B29C 70/443
USPC ................... 52/2.11, 2.13, 2.15, 2.17, 86, 88; 264/313, 314, 316
See application file for complete search history.

(56) References Cited

U.S. PATENT DOCUMENTS 2,999,272 A * 9/1961 Warnken ........................ 425/389
3,470,279 A * 9/1969 Abbott ............................ 264/72

(Continued)

FOREIGN PATENT DOCUMENTS

DE 3621611 * 1/1988 ................ E01D 7/00
DE 3621611 A1 * 1/1988 ................ E01D 7/00

*Primary Examiner* — Brian Glessner
*Assistant Examiner* — Adam Barlow
(74) *Attorney, Agent, or Firm* — MacMillan, Sobanski & Todd, LLC

(57) ABSTRACT

An inflatable mold assembly for forming a hollow composite construction member that is suitable for use as a building material has a longitudinal axis. The mold assembly further has a flexible, substantially tubular bladder wall defining an elongated inflatable cavity. A reinforcing fabric is positioned concentrically around the flexible bladder wall. A flexible air-impervious outer layer is positioned concentrically around the fabric, with the bladder wall and the outer layer defining an elongated annular space, and with the fabric being positioned within the elongated annular space.

26 Claims, 13 Drawing Sheets

(56) References Cited

U.S. PATENT DOCUMENTS

| | | | |
|---|---|---|---|
| 3,896,206 A * | 7/1975 | Beaver et al. | 264/258 |
| 4,158,586 A * | 6/1979 | Usui | 156/175 |
| 4,212,621 A * | 7/1980 | Michelotti | 425/405.2 |
| 4,560,523 A * | 12/1985 | Plumley et al. | 264/102 |
| 4,746,386 A * | 5/1988 | Sato et al. | 156/175 |
| 4,808,362 A * | 2/1989 | Freeman | 264/257 |
| 5,328,656 A * | 7/1994 | Thulin | 264/571 |
| 5,546,707 A * | 8/1996 | Caruso | 52/2.13 |
| 5,960,834 A * | 10/1999 | Sekido et al. | 138/125 |
| 6,123,485 A * | 9/2000 | Mirmiran et al. | 405/252 |
| 6,182,398 B1 * | 2/2001 | Head | 52/2.13 |
| 6,189,286 B1 * | 2/2001 | Seible et al. | 52/834 |

* cited by examiner

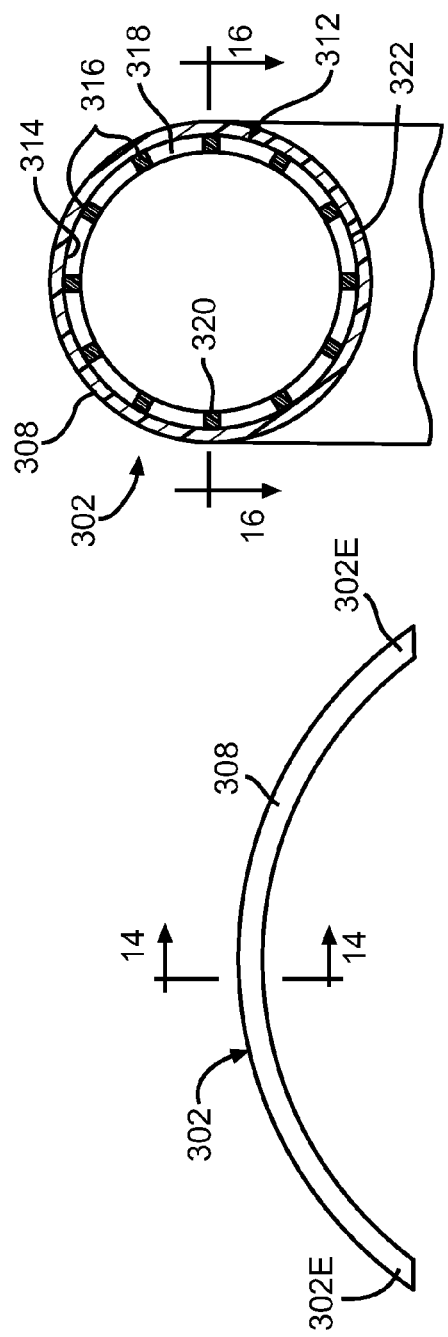
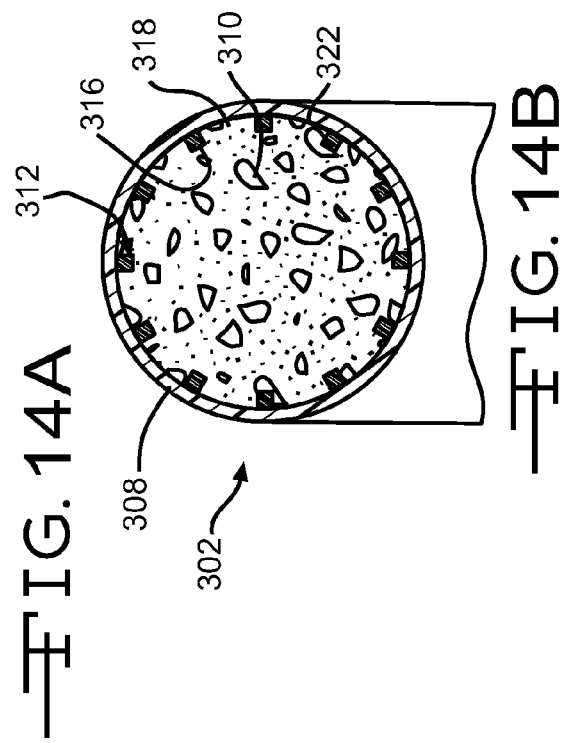
FIG. 14A
FIG. 14B
FIG. 13

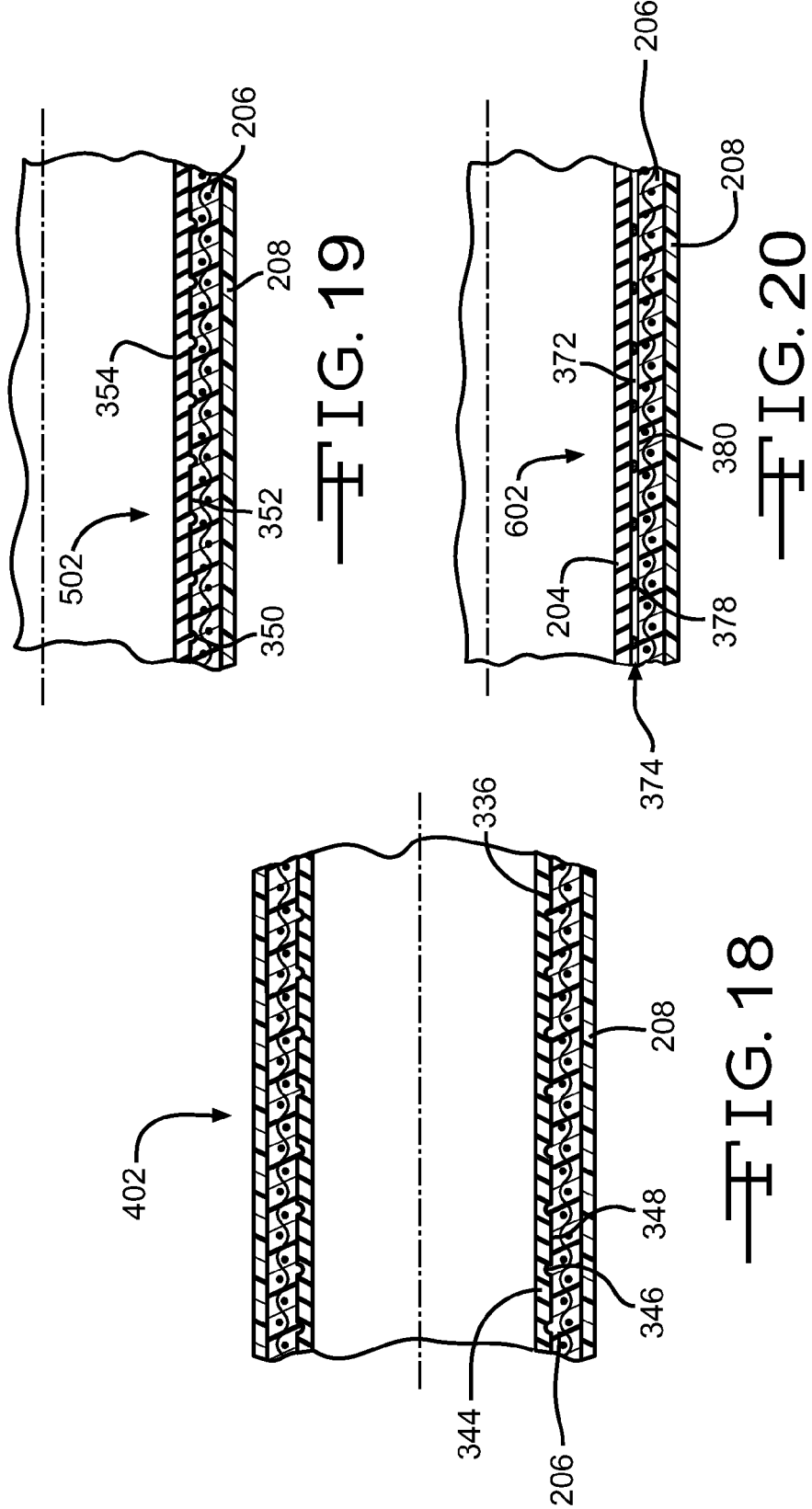

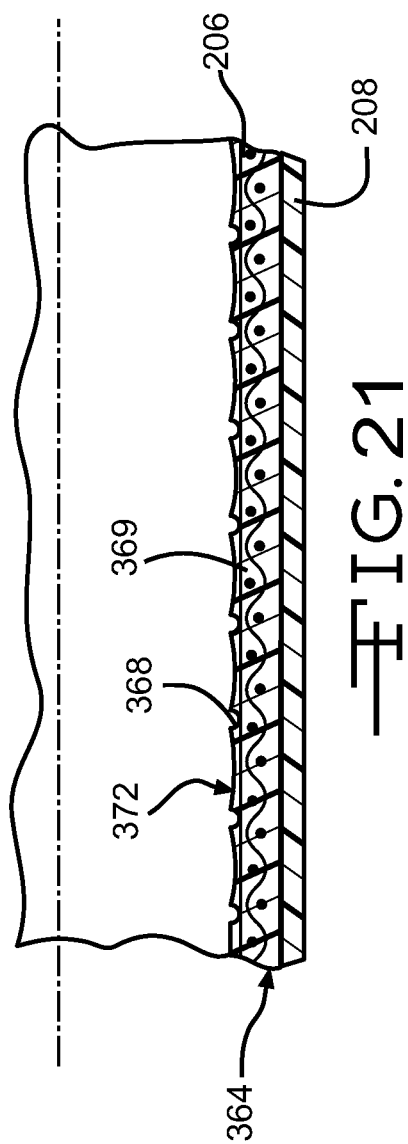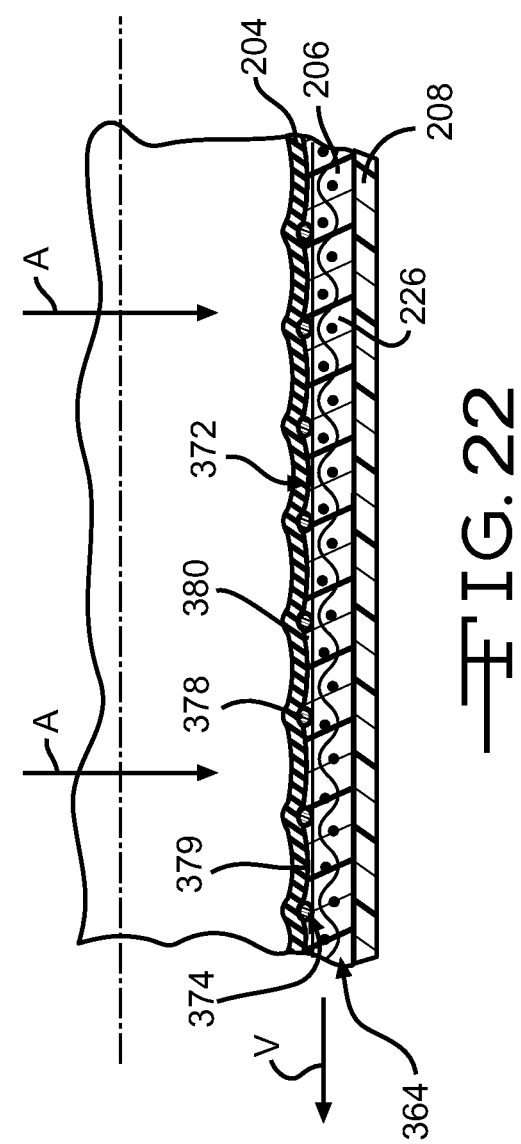

COMPOSITE STRUCTURAL MEMBER

CROSS REFERENCE TO RELATED APPLICATIONS

This application is a continuation of U.S. Ser. No. 12/891,032, issued Sep. 3, 2013 as U.S. Pat. No. 8,522,486, which is: (1) a Continuation-In-Part of U.S. Ser. No. 11/642,240, filed Dec. 19, 2006, issued as U.S. Pat. No. 7,811,495, which claimed the benefit of U.S. Provisional Application No. 60/752,233 filed Dec. 20, 2005; and (2) a Continuation-In-Part of U.S. Ser. No. 11/043,420, filed Jan. 26, 2005, pending; the disclosures of all of which are incorporated herein by reference.

BACKGROUND

Various embodiments of a composite construction member and methods of making such construction members are described herein. In particular, the embodiments described herein relate to improved composite construction members of the type usually suitable for use as a building material. Examples of such members include lightweight tubular arches and beams.

In the past, there have been several types of technologies that have been used in order to construct short and medium span buried arch bridges, as well as some underground storage facilities and tunnels. These structures are commonly arch-shaped, and typically are covered with a soil overburden which receives traffic or other loading. Arch-shaped construction members are also used in building construction as structural members.

One method for providing such construction members is to use pre-cast concrete structures which are made in one location and then shipped to the construction site. Another system includes the use of cast-in-place concrete structures which are formed at the construction site and then lifted into place by cranes or the like. Yet another technology includes the use of metallic pipe structures. Further, metallic and steel reinforced concrete can be used as construction members. Increasingly, composite materials are being used in the construction industry.

Important factors in selecting construction materials include cost of the materials, ease of transport and installation, durability, weight, length of time for construction, need for lifting equipment for installation, complexity of the construction sequence, overall performance, and overall installed cost. It would be advantageous if improved construction materials and systems for the construction industry could be developed.

SUMMARY

The present application describes various embodiments of a composite construction member. In one embodiment, an inflatable mold assembly for forming a hollow composite construction member that is suitable for use as a building material has a longitudinal axis. The mold assembly further has a flexible, substantially tubular bladder wall defining an elongated inflatable cavity. A reinforcing fabric is positioned concentrically around the flexible bladder wall. A flexible air-impervious outer layer is positioned concentrically around the fabric, with the bladder wall and the outer layer defining an elongated annular space, and with the fabric being positioned within the elongated annular space.

In another embodiment, a system for making a rigid hollow composite construction member includes an inflatable mold assembly for a hollow composite construction member suitable for use as a building material. The inflatable mold assembly is elongated and has a longitudinal axis. The mold assembly further has a flexible, substantially tubular bladder wall defining an elongated inflatable cavity. A reinforcing fabric is positioned concentrically around the flexible bladder wall. A flexible, air-impervious outer layer is positioned concentrically around the fabric, with the bladder wall and the outer layer defining an elongated annular space. The fabric is positioned within the space. Apparatus for applying tension to the fabric in a longitudinal direction, apparatus for introducing a fluid into the cavity to inflate the tubular bladder wall are provided, and apparatus for infusing the elongated annular space and the fabric with a rigidification material to form a rigid hollow composite construction member are provided.

In another embodiment, an inflatable mold assembly for forming a hollow composite construction member suitable for use as a building material has a longitudinal axis. The mold assembly further has a flexible, substantially tubular bladder wall defining an elongated inflatable cavity. A reinforcing fabric is positioned concentrically around the flexible bladder wall. A flexible air-impervious outer layer is positioned concentrically around the fabric, with the bladder wall and the outer layer defining an elongated annular space. The fabric is positioned within the space. An intermediate member is positioned concentrically within the elongated annular space between the reinforcing fabric and the tubular bladder.

In another embodiment, a hollow composite construction member suitable for use as a building material includes a tubular primary reinforcement member that has a hollow interior and is formed from a first material. A shear transfer member is bonded to an inside surface of the tubular primary reinforcement member. A secondary reinforcement material at least partially fills the hollow interior of the tubular primary reinforcement member. The secondary reinforcement material is different from the first material.

In a further embodiment, a hollow composite construction member suitable for use as a building material includes a tubular primary reinforcement member that has a hollow interior and is formed from a first material. One of an array of grooves and ridges is formed on an inside surface of the tubular primary reinforcement member. The array defines a shear transfer member. A secondary reinforcement material at least partially fills the hollow interior of the tubular primary reinforcement member. The secondary reinforcement material is different from the first material.

Other advantages of the composite construction member will become apparent to those skilled in the art from the following detailed description, when read in light of the accompanying drawings.

BRIEF DESCRIPTION OF THE DRAWINGS

FIG. 13 is an elevational view of a first embodiment of the hybrid composite construction member illustrated in FIG. 12.

FIG. 14A is a first transverse cross-sectional view taken along the line 14-14 in FIG. 13, showing the hollow composite construction tube with the concrete removed.

FIG. 14B is a second transverse cross-sectional view taken along the line 14-14, showing concrete within the hollow composite construction tube.

FIG. 18 is a schematic cross-sectional view in elevation of a portion of a first alternate embodiment of the mold assembly illustrated in FIG. 2.

FIG. 19 is a schematic cross-sectional view in elevation of a portion of a second alternate embodiment of the mold assembly illustrated in FIG. 2.

FIG. 20 is a schematic cross-sectional view in elevation of a portion of a third alternate embodiment of the mold assembly illustrated in FIG. 2.

FIG. 21 is a schematic cross-sectional view in elevation of the fabric layer illustrated in FIG. 20, showing the fabric layer infused with rigidification material and the mold pattern member removed.

FIG. 22 is a schematic cross-sectional view in elevation of the fabric layer illustrated in FIG. 20, showing the fabric layer infused with rigidification material and the mold pattern member bonded to the fabric layer.

DETAILED DESCRIPTION OF THE INVENTION

Current technologies for producing curved composite structures from an inflatable tubular mold assembly are limited by fabric architecture. In conventional methods for making composite structures from inflatable mold assemblies, each unique curve geometry requires a unique fabric architecture, which makes it very costly to design and produce a wide range of curved member geometries for the inflatable mold assemblies. With the embodiments illustrated, it is possible to produce a wide range of curved tubular fiber-reinforced polymer composite structural members by rigidifying the inflatable composite structure made with a single inflatable mold assembly, with various curvatures being achievable even though the starting inflatable mold assembly has a single parent fabric architecture. This parent fabric architecture may vary, and still be capable of producing members having any continuous curvature.

The embodiments illustrated and described herein include curved tubular fiber-reinforced polymer or plastic (FRP) composite structural members that are made with an inflatable mold assembly and formed around a curved support and infused with a rigidification material, such as an organic or inorganic polymer material. Continuous fibers that are longitudinally oriented are substantially prevented from buckling when formed to a large curvature, even on the interior side of the structure, by tensioning the ends of the fabric as the rigidification material is infused. This greatly improves the load carrying capacity of the curved tubular fiber-reinforced polymer composite structural member.

The curved tubular fiber-reinforced polymer composite structural members can be produced without structurally significant or substantially visible fiber wrinkling by using a tensioned braided fabric over an inflatable mold. Because the fibers may be placed close to the longitudinal axis of the inflatable mold without substantial fiber wrinkling or buckling, the ultimately produced curved tubular fiber-reinforced polymer composite structural member is capable of efficiently supporting multiple types of loadings for many structures, including but not limited to curved arched bridges, airplane hangars, buried tunnels and bunkers, rapidly-deployable buried arch bridges and long-span culverts.

In one embodiment, a method for forming a curved tubular fiber-reinforced polymer composite structural member of the type suitable for use as a building material is disclosed. The method for forming such curved tubular fiber-reinforced polymer composite structural members eliminates or substantially reduces any of the fiber buckling or wrinkling which causes weaknesses in a finished reinforcement structure. In certain embodiments, the fabric layer comprises a three-dimensional braided fibrous fabric material which is infused with a suitable rigidification material, such as a resin.

Figure 1:
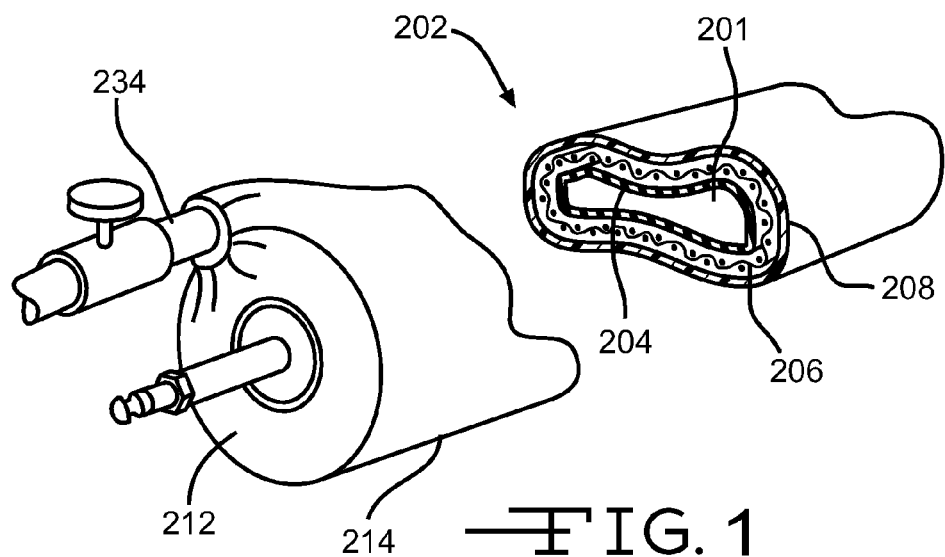
FIG. 1 is a schematic illustration of portions of an inflatable tubular mold assembly for making composite construction members, the mold assembly being in a deflated condition.
Figure 10:
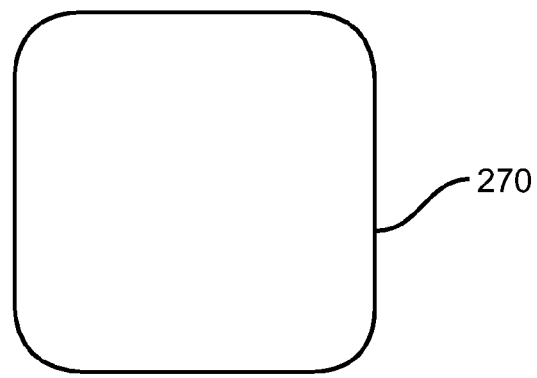
Figure 11:
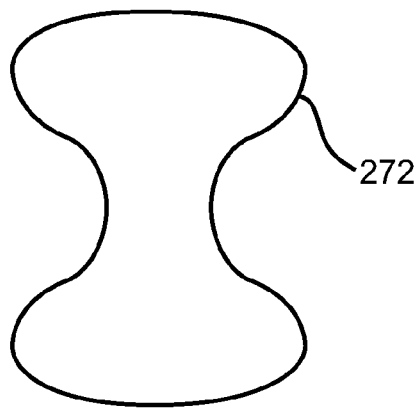

Referring now to FIGS. 1 through 4, an inflatable tubular mold assembly 202 defines an interior cavity 201. FIG. 1 shows the inflatable mold assembly 202 in a deflated condition. While the inflatable mold assembly 202 schematically shown in the figures has a generally circular cross-sectional shape when fully inflated, it is to be understood that the specific dimensions of the inflatable mold assembly 202 are guided by the end use application for which the inflatable mold assembly 202 is being used. For example, the exterior shape of the inflatable bladder 204 in the inflatable mold assembly 202 can have a generally circular, oval, or other useful structural configuration (as shown, for example, in FIGS. 9 through 10). In another embodiment, the inflatable bladder 204 can have a cross-section that has a shape that approximates the cross-sectional shape of an I-beam, as shown in FIG. 11.

Figure 2:
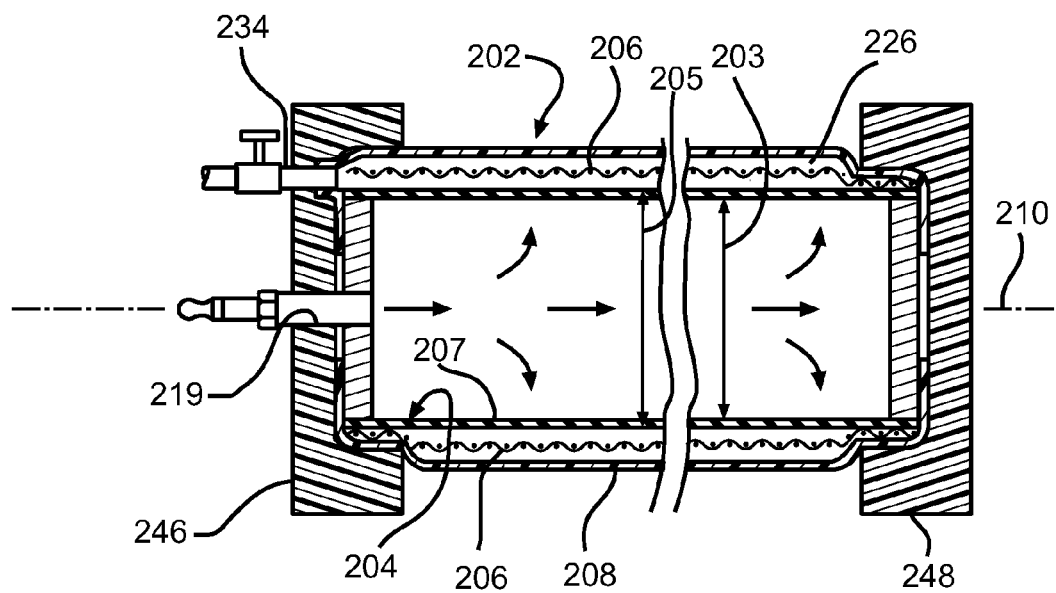
FIG. 2 is a schematic cross-sectional view in elevation of a portion of the mold assembly in a partially inflated condition.
Figure 3:
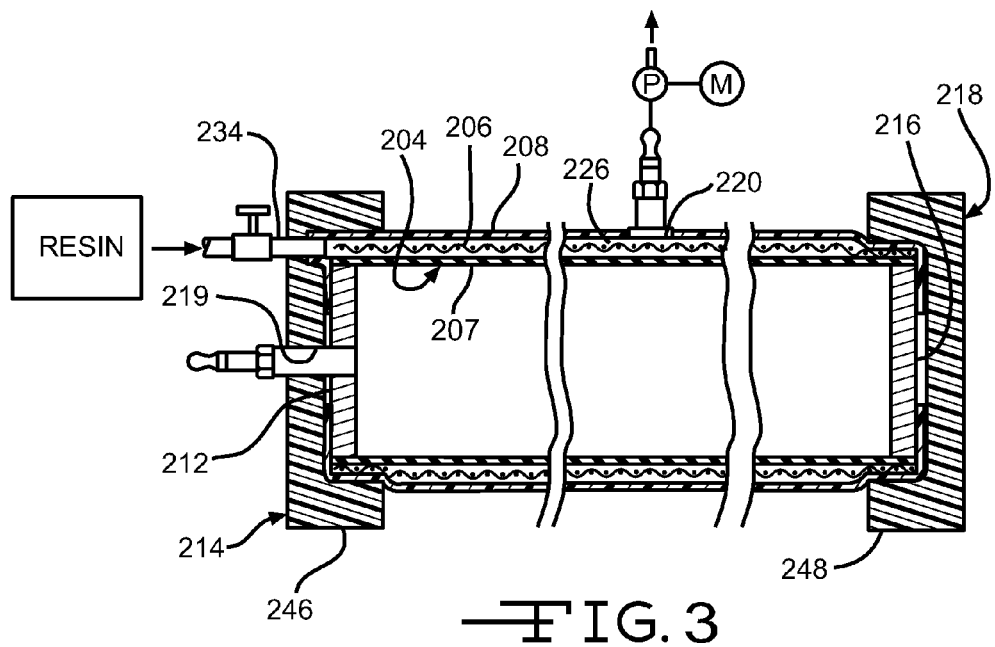
FIG. 3 is a schematic view similar to that of FIG. 2, with the mold assembly fully inflated, and with a partial vacuum applied to the mold assembly.
Figure 4:
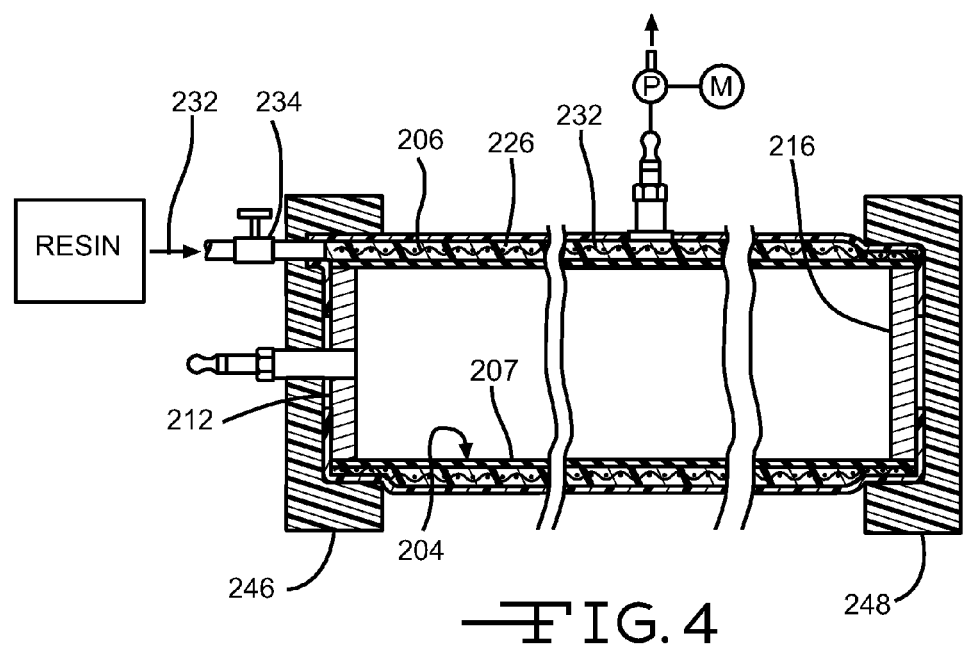
FIG. 4 is a schematic view similar to that of FIG. 2, with the mold assembly undergoing rigidification.
Figure 6:
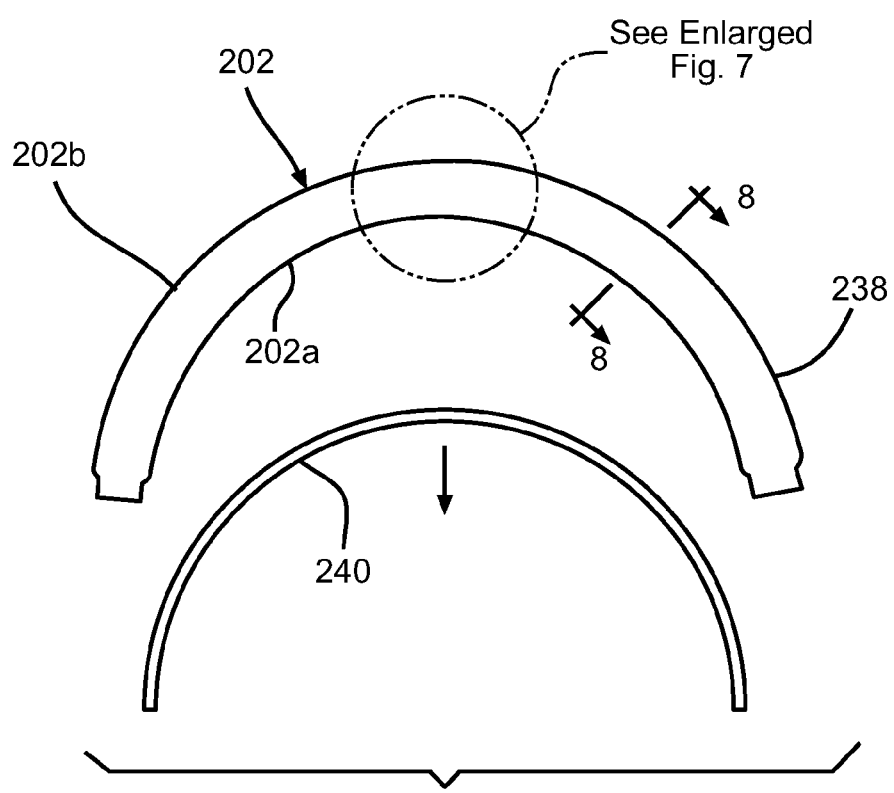
FIG. 6 is a schematic illustration of a rigidified inflatable composite structure after being removed from a formwork.

The inner cross-sectional dimension 203 as shown in the FIGS. 2 through 4 is the diameter of the interior of the inflatable bladder 204 when the bladder is inflated. The outer cross-sectional dimension 205 is the diameter of the exterior of the inflatable bladder 204 and the diameter of the interior of the rigidified composite structure 238, as best shown in FIG. 6. Regardless of the geometric shape of the cross-section of the inflatable mold assembly 202, the curved tubular fiber-reinforced polymer composite structural member 238 (shown in FIG. 6) resulting from use of the inflatable mold assembly 202 is a composite member that is considered to be tubular as described herein.

Also, in certain other embodiments illustrated and described herein, the cross-sectional dimension 205 of the inflatable bladder 204 can vary along its axial or longitudinal length. In such embodiments, the diameter, or major outer cross-sectional dimension 205 of the inflatable bladder 204 can vary such that the finished curved tubular fiber-reinforced polymer composite structural member 238 can have different cross-sectional dimensions at different locations, depending on the needs of the end use application. For example, in certain end use applications, such as for example, an arch, it may be desired that lower portions of the inflatable mold assembly 202 adjacent the ground have a larger cross-section in order to add additional support for the upper portions of the finished curved tubular fiber-reinforced polymer composite structural member 238.

The inflatable mold assembly 202 includes at least one tubular inflatable bladder 204, at least one reinforcing fabric, such as a reinforcing flexible fabric layer 206, and at least one air-impervious outer layer 208. The interior wall 207 of the inflatable bladder 204 defines the elongated inflatable cavity, 201. The reinforcing flexible fabric layer 206 is positioned concentrically around the inflatable bladder 204. The flexible air-impervious outer layer 208 is positioned concentrically around the flexible fabric layer 206, with the inflatable bladder 204 and the air-impervious outer layer 208 defining an elongated interstitial space 226 (i.e., the space between the flexible fabric layer 206 and the inflatable bladder 204), with the flexible fabric layer 206 being positioned within the space 226. When the cross-sectional shape of the inflatable bladder 204 is approximately circular, the elongated space has a substantially annular cross-section.

In certain alternative embodiments, the tubular inflatable bladder 204 is made of a suitably flexible air impervious material. Examples of materials that can be used for the tubular inflatable bladder 204 are nylon, Mylar, urethane, butyl rubber, high density polyethylene, vinyl, polyester, reinforced rubber, and silicone. Other materials can also be used. In certain embodiments, the flexible fabric layer 206 comprises a fibrous material having a desired pattern or geometry of fibers, such as braided or woven fibers. In certain alternative embodiments, the fabric layer can comprise one or more types of fibers such as, for example, glass, carbon, polyethylene, polyester, aramid fiber, and mixtures thereof. The air-impervious outer layer 208 can be any suitable flexible air impervious material, such as, for example, nylon, Mylar, urethane, butyl rubber, high density polyethylene, vinyl, polyester, reinforced rubber, and silicone.

In the embodiment shown, the inflatable mold assembly 202 is elongated, having a longitudinal axis 210. The inflatable mold assembly 202 includes a first cap member 212 at a first end 214 of the inflatable mold assembly 202, and a second cap member 216 at an opposed, second end 218 of the inflatable mold assembly 202. The cap member 212 includes a sealable opening 219 through which a fluid material can flow to inflate the inflatable mold assembly 202. In certain embodiments, for example, the fluid material can be gaseous (such as air), or liquid (such as water). Although the mold is shown as being elongated, it is to be understood that it need not be elongated.

FIG. 2 shows the inflatable mold assembly 202 in a partially inflated condition where air is being directed into the interior cavity 201 of the tubular inflatable bladder 204 through the opening 219. As shown in FIG. 3, the air-impervious outer layer 208 can include a sealable vacuum opening 220 through which air can be removed from the space 226 between the air-impervious outer layer 208 and the tubular inflatable bladder 204. It is to be understood that the space 226 is at least partially filled with the flexible fabric layer 206. A suitable device for removing air in the space 226 is a vacuum pump P, run by a motor M, although other devices can be used. The vacuum opening 220 can be placed anywhere along the length of the inflatable mold assembly 202, including a position at one end of the inflatable mold assembly 202. Any number of openings 220 can be used. It should be understood that the use of an evacuation mechanism is optional, such as, for example, when a resin transfer molding process is used.

During the infusion of the fluid rigidification material 232, such as a resin, the rigidification material is driven or pumped under a pressure differential via rigidification material inlet or resin port 234, through the space 226. At the same time, typically, gas may be removed from the space 226. Any number of resin ports 234 can be used. The resin ports 234 can be placed in the end of the inflatable mold assembly 202 as shown, or through the air-impervious outer layer 208 anywhere along the length of the inflatable mold assembly 202. The resin is infused into and permeates the flexible fabric layer 206. The apparatus disclosed for infusing the rigidification material 232 into the space 226 is merely illustrative, and any suitable system for infusing the flexible fabric layer 206 with the rigidification material can be used.

Figure 7:
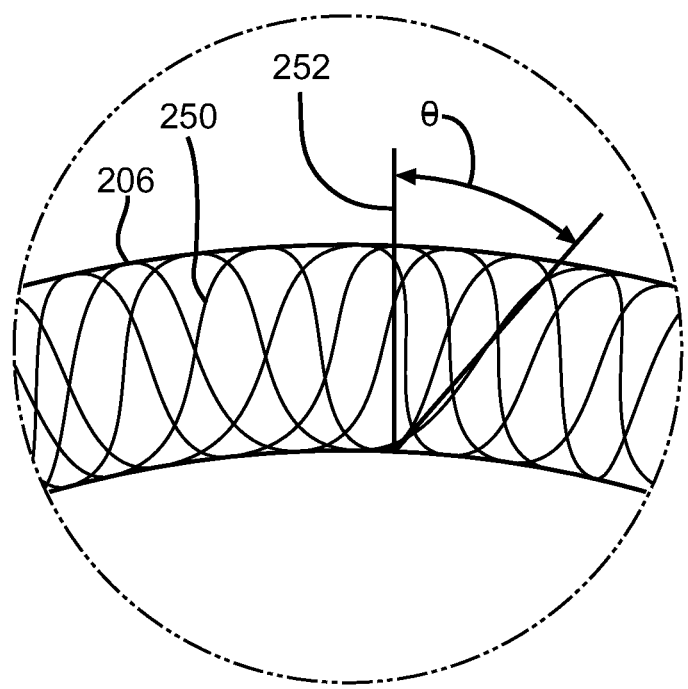
FIG. 7 is an enlarged schematic illustration of an area in FIG. 6 showing a braid angle of fibers in rigidified inflatable composite structure relative to the hoop direction of the rigidified inflatable composite structure.

FIG. 4 shows the rigidification material 232 fully permeating the flexible fabric layer 206. The rigidification material can be any organic or inorganic material that can be pumped into or infused into the space 226, and which then sets or hardens into a rigid or semi-rigid material. Examples of organic materials include thermo-set resins, such as vinyl esters, polyesters, epoxies and the like. Other inorganic materials, such as cements or grouts can be used for the rigidification material. Once the rigidification material 232 is positioned within the space 226 and the rigidification or setting of the material takes place, a composite construction member, such as the curved tubular fiber-reinforced polymer composite structural member 238 shown in FIG. 7, is formed. The curved tubular fiber-reinforced polymer composite structural member 238 is primarily useful as a building material, although it can be used for other purposes.

Figure 5:
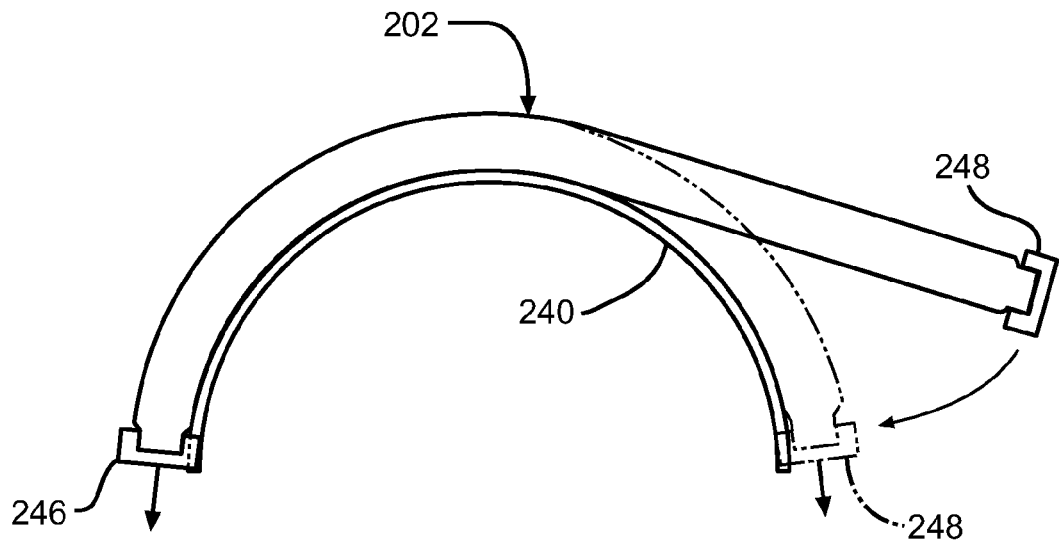
FIG. 5 is a schematic illustration showing an inflated mold assembly being bent around a formwork while an external force is being applied tangent to a curvature of the inflated curved mold assembly at a point of contact with the formwork, and showing a device for applying tension to an end of the curved mold assembly.

As shown in FIG. 5, during the molding process the inflatable mold assembly 202 is positioned against, or at least partially in, a formwork 240, with the inflatable mold assembly 202 bent around or otherwise made to conform to the formwork 240. In the embodiment shown, the formwork 240 has a continuous semi-circular shape. The formwork 240 facilitates bending the inflatable mold assembly 202 to the desired shape during forming. The formwork 240 can have any shape suitable for producing a composite construction member of the required configuration.

Figure 9:
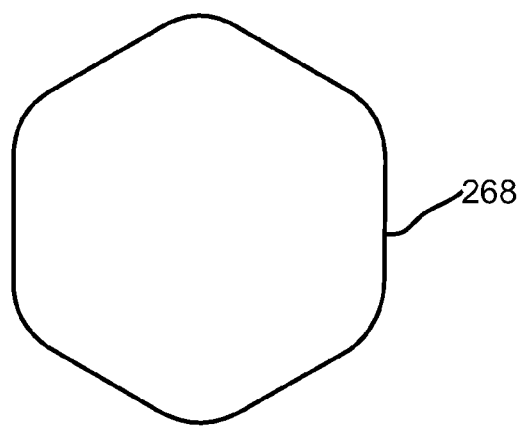
FIGS. 9 through 11 are schematic illustrations of various cross-sectional shapes of additional rigidified inflatable composite structures filled with a load bearing material.

It will be understood that the formwork 240 can have any continuous generally curved shape, including compound curves and non-planar curves. In some embodiments, the formwork 240 can have non-round side walls such that the inflatable mold assembly 202 can be formed into a composite structure having cross-sectional shapes that are not circular. FIG. 9 shows a rounded hexagonal outline for a composite structure 268. FIG. 10 shows a rounded square outline for a composite structure 270. FIG. 11 shows an approximately I-beam shaped outline for a composite structure 272.

Figure 8:
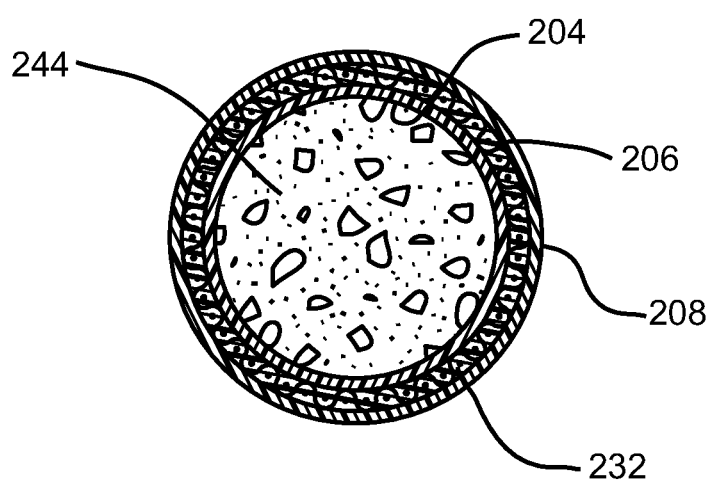
FIG. 8 is a schematic illustration taken along the line 8-8 in FIG. 6, showing a rigidified inflatable composite structure filled with a load bearing material.

Optionally, the rigidified composite structure 238 can be filled with a load bearing material 244, such as, for example, material selected from the group including non-shrink concrete, expansive concrete, non-shrink grout, expansive grout, foam, sand, and the like, as shown in FIG. 8.

It is to be understood that a suitable external force can being applied tangent to a curvature of the inflatable mold assembly 202 at a point of contact when the inflatable mold assembly 202 is being formed into a generally arcuate longitudinal shape. Also, while the formwork 240 shown in the Figures herein supports the inflatable mold assembly 202 along an interior arc 202a of the inflatable mold assembly 202, as shown in FIG. 6, it may be also possible for the formwork 240 to provide the desired curvature for the inflatable mold assembly 202 on an exterior arc 202b of the inflatable mold assembly 202.

Advantageously, many different shapes and configurations of the rigidified composite structure 238 can be formed using only one, generally universal type, or architecture, of flexible fabric layer 206. The maker of the inflatable mold assembly 202 is therefore able to use a single type or design of fabric architecture to produce a wide variety of curved tubular fiber-reinforced polymer composite structural members having any desired curvature.

In certain embodiments of the methods described herein, a suitable amount of tension is applied to the fabric in one or both of the hoop (radial) and/or longitudinal (axial) directions to minimize, and optimally substantially eliminate, fiber wrinkling and buckling in the fabric, even when the inflatable mold assembly 202 is bent. The suitable amount of tension may vary, but as used herein, a suitable amount of tension may be an amount of tension which causes a stress in the fibers of about less than about 2 percent of the fiber's ultimate tensile capacity. In the embodiments illustrated and described herein, a tension force which causes within the range of from about 30 p.s.i. to about 1000 p.s.i. of stress in the fibers is applied. Once the composite structure 238 becomes rigid, the outer layer 208 and the bladder 204 of the mold assembly 202 may be removed.

FIG. 7 is an enlarged schematic illustration of an area in FIG. 6 showing a braid angle θ of some of the fibers 250 in the flexible fabric layer 206 relative to the hoop direction 252 of the inflatable mold assembly 202. The hoop direction 252 is that direction which, if followed, would be the shortest planar closed path along the surface of the cross section. For clarity in FIG. 7, most of the fibers in the fabric have been left out, so that the path of the remaining representative fibers is more readily seen. The included angle, θ, is the off hoop direction angle of the fiber. The fibers follow a continuous approximately helical path along the surface of the flexible fabric layer 206 from one end to the other. In FIG. 7 only one fiber angle is shown but multiple layers and angles for each layer may be used in any combination selected for this process, and the angle of individual fibers may vary around the cross-section or along the longitudinal length of the rigidified composite structure 238.

If any specific fiber is not parallel to the hoop direction 252, then the fiber is oriented in a non-hoop direction, and its deviation from the hoop direction can be measured by the angle θ. Fibers that are oriented at an angle θ that is above a threshold level, such as, for example, 30 degrees, can be considered to have a significant longitudinal component, i.e., they have a significant component in the direction of the longitudinal axis 210. These fibers can be considered to be generally longitudinally extending fibers. The longitudinally extending fibers in the flexible fabric layer 206 are prevented from buckling on a large curvature while the inflatable mold assembly 202 is being bent during the molding process by tensioning the flexible fabric layer 206 as the resin is infused into the flexible fabric layer 206. These are critical fibers from a structural viewpoint, as they carry the bending stresses in the member. Unlike the off-hoop fibers, the hoop-oriented fibers are not susceptible to buckling when a large curvature is applied to the mold assembly.

The curved tubular fiber-reinforced polymer composite structural member 238 can be produced without substantial fiber wrinkling of the generally longitudinally extending fibers, i.e., the fibers initially oriented at an angle greater than about 30 degrees. This is because when a substantial portion of the generally longitudinally oriented fibers are tensioned during the infusion and curing of the resin, the off-hoop fibers are brought into and held in their designed alignment along the outer surface of the inflatable bladder 204, effectively minimizing or eliminating fiber wrinkling or buckling. In certain embodiments, the flexible fabric layer 206 is made with a simple set of repeating patterns such as woven or braided fabrics that have bundles or stands of similarly oriented fibers set in a repeating pattern or desired fabric architecture.

The exemplary methods illustrated and described herein allow for the formation of structural composites that can have any desired shape. The exemplary methods further eliminate the need to first form a fabric that has sections of the fabric material with different weave patterns or fiber configurations in order to form shaped structures.

In certain embodiments, it is desired that certain of the fibers, or bundles of fibers, be oriented, either by tensioning or by their original orientation, into an off-hoop direction of between about 30 and 90 degrees. The restrained or tensioned off-hoop oriented fibers retain their desired orientation without buckling or wrinkling even when the inflatable mold is bent, thereby adding strength to the ultimate curved tubular fiber-reinforced polymer composite structural member 238. During the tensioning of the fabric, the fibers, or bundles of fibers are either pulled or allowed to relax into the desired off-hoop orientation.

It can be seen that by using a flexible fabric layer 206 that is constructed properly, and by using tensioning during the bending and resin infusing process, a single fabric design or architecture can be made to accommodate many different bending configurations. Consequently, the flexible fabric layer 206 is structured to be capable of conforming to molds shaped into various curvatures while still being held under tension.

Figure 23:
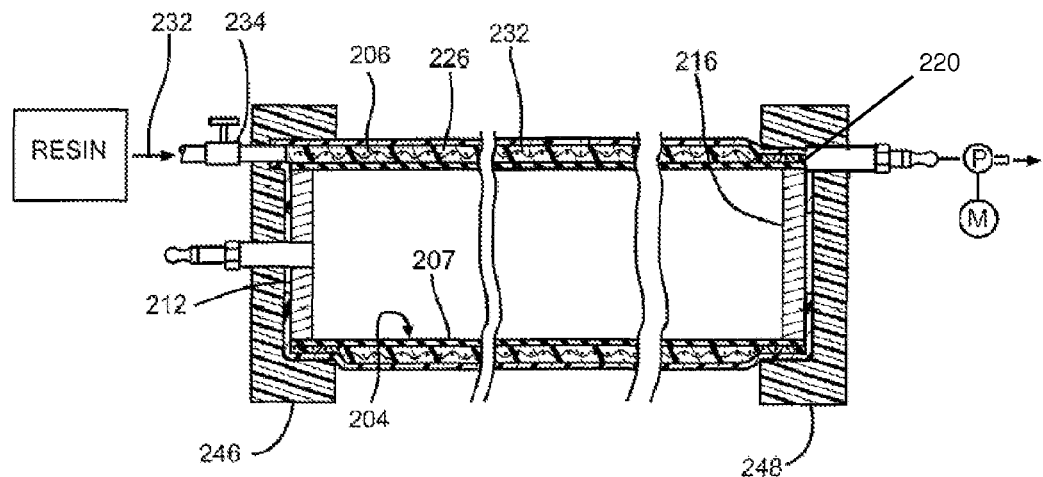
FIG. 23 is a schematic cross-sectional view in elevation of a portion of the mold assembly illustrated in FIG. 4, showing an alternate embodiment of the vacuum opening.
Figure 24:
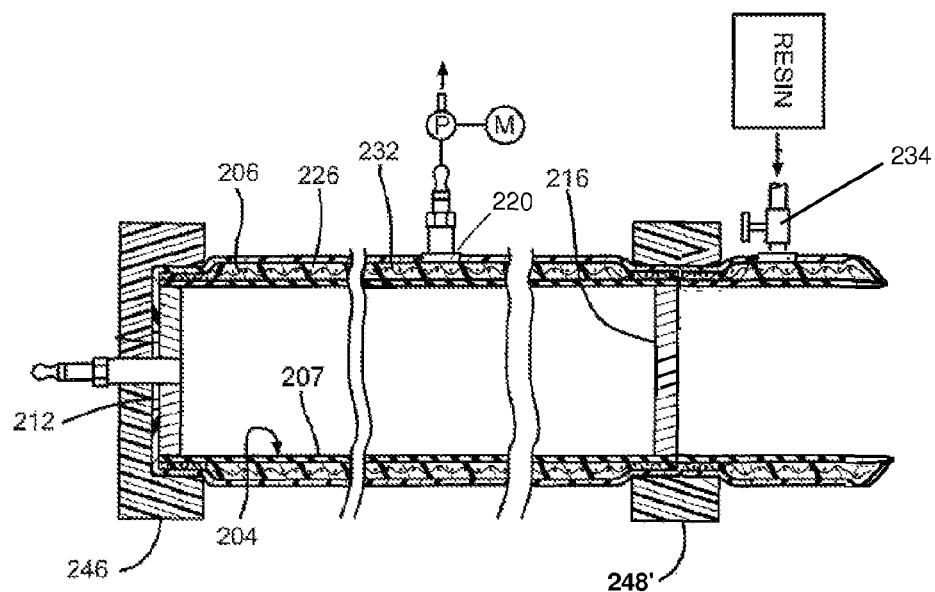
FIG. 24 is a schematic cross-sectional view in elevation of a portion of the mold assembly illustrated in FIG. 4, showing a first alternate location of the rigidification material inlet.
Figure 25:
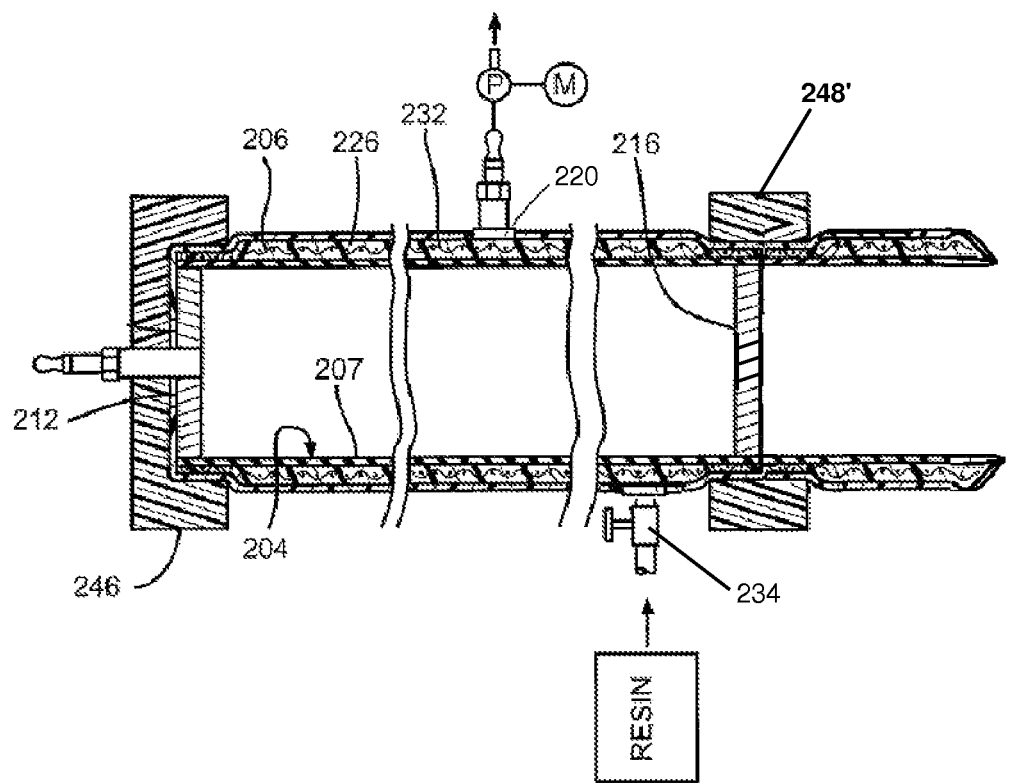
FIG. 25 is a schematic cross-sectional view in elevation of a portion of the mold assembly illustrated in FIG. 4, showing a second alternate location of the rigidification material inlet.

In certain embodiments, the amount of tension applied to the fabric necessary to overcome fiber wrinkling can be a small fraction of the ultimate tensile capacity of the fabric. The tension on the fabric can be applied using any suitable device, such as a gripping device. One example of such a gripping device is shown schematically in FIGS. 3 through 5 where gripping systems 246 and 248 are positioned at the ends 214 and 218 of the inflatable mold assembly 202, respectively. The gripping systems apply tension to the flexible fabric layer 206. The gripping systems 246 and 248 can be any mechanisms suitable for connecting to and applying tension to the flexible fabric layer 206. The gripping systems 246 and 248 can be in the form of end rings, or can be a pneumatic expandable plug or a mechanical plug. Further, the elongated inflatable mold assembly 202 can include the vacuum opening 220 positioned outside of the gripping systems, a vacuum opening positioned between the gripping systems, or a vacuum opening positioned inside the gripping systems, as shown in FIG. 23 at 220'. Also, the elongated inflatable mold assembly 202 can include a rigidification material inlet positioned outside of the gripping systems, as shown in FIG. 24 at 234', between the gripping systems, as shown in FIG. 25 at 234", or inside the gripping systems, as shown in FIG. 4 at 234. The tension applied by a gripping system can also serve to keep the inflatable mold assembly 202 in contact with the formwork 240. In some designs of the inflatable mold assembly 202, the mere inflation of the inflatable bladder 204 is sufficient to cause the fibers to be placed under tension. In such a case, the gripping systems 246 and 248 may act to restrain or control the application of tension to the fibers.

In the embodiments where tension is applied to the flexible fabric layer 206, the tensioning reduces fiber waviness and increases the weave pattern uniformity, thereby ultimately producing completed curved tubular fiber-reinforced polymer composite structural members 238 having a much higher load carrying capacity than would be produced using otherwise identical un-tensioned fibers. Tensioning of the flexible fabric layer 206 also produces a marked reduction in variation of finished product properties. Also, when the tension is applied to the flexible fabric layer 206, any fibers that reorient will be reoriented by the tensioning closer to the longitudinal axis of the member, thereby ultimately increasing the strength of the final curved tubular fiber-reinforced polymer composite structural member 238. In some embodiments, the fibers of the flexible fabric layer 206 are allowed to realign without substantial wrinkling or buckling as the inflatable mold assembly 202 is being curved. In some embodiments, during the tensioning of the fabric, the gripping of the ends 214 and 218 allow certain of the fibers which are under much higher tension than adjacent fibers to slip until the load is redistributed.

In certain embodiments, the desired tension can be achieved or established before final inflation pressure of the tubular inflatable bladder 204 is reached. For example, the gripping systems 246 and 248 can be tightened on the flexible fabric layer 206 prior to final inflation of the tubular inflatable bladder 204. In other embodiments, once the predetermined geometric shape is achieved, tensioning due to mold elongation motivated by increased bladder pressure will begin to occur.

In certain embodiments, rigidification of the inflatable mold assembly 202 can proceed by infusing the fabric with a resin while the fibers are under tension. Also, the forming of the curved tubular fiber-reinforced polymer composite structural member 238 can be carried out in several different arrangements of steps, including, for example:

i) positioning a fabric layer over an inflatable tubular wall, inflating the tubular wall to shape the fabric, and infusing the fabric with a rigidification material;

ii) positioning a fabric layer over an inflatable tubular wall, inflating the tubular wall to shape the fabric, bending the inflated tubular wall into a desired shape, and infusing the shaped fabric with a rigidification material;

iii) inflating a tubular wall, positioning a fabric layer over the inflated tubular wall, bending the inflated tubular wall and fabric into a desired shape, and infusing the shaped fabric with a rigidification material; and iv) positioning a fabric layer over an inflatable tubular wall, partially inflating the tubular wall to shape the fabric, bending the inflated tubular wall into a desired shape, completing the inflation of the tubular wall, and infusing the shaped fabric with a rigidification material. In all of the above arrangements, the fabric is subjected to tension forces.

In an alternate embodiment, the flexible fabric layer 206 is preimpregnated with a resin, and the rigidification process is initiated after or during the shaping process by any suitable mechanism to create the curved tubular fiber-reinforced polymer composite structural member. The rigidification of the resin can be initiated by the infusion of a chemical initiator or catalyst, by the application of heat or light, or by any other suitable method.

In another embodiment, a plurality of the elongated inflatable mold assemblies are arranged together, with tension applied to the fabric of each mold assembly. Each of the plurality of mold assemblies is shaped to a desired shape while maintaining the fabric under tension. The reinforcing fabric in each mold assembly is infused with a rigidification material, and the rigidification material can be infused in each of the mold assemblies either separately or at the same time. In this manner, after the rigidification material is hardened while maintaining the fabric in tension, a multitude of curved tubular fiber-reinforced polymer composite structural members can be formed. The multitude of elongated inflatable mold assemblies can be formed to the same curvature, or can be configured with different curvatures.

The illustrated inflatable mold assembly 202 can be viewed as a precursor for a curved tubular fiber-reinforced polymer composite structural member suitable for use as a building material. The elongated inflatable mold assembly 202 can be used to make curved tubular fiber-reinforced polymer composite structural members in any desired suitable location, such as a construction site of a building, buried bridge structure, or other structure where curved tubular fiber-reinforced polymer composite structural members are needed. Further, the curved tubular fiber-reinforced polymer composite structural members can be filled in place with any desired material, such as non-shrink concrete, expansive concrete, non-shrink grout, expansive grout, foam, and sand. Also, a construction kit, including one or more of the elongated inflatable mold assemblies can be prepared and shipped to a construction site. Such a kit could optionally include a supply of compressed air to inflate the tubular bladder, a source of resin ingredients, a source of vacuum, and a framework suitable both to shape the inflatable mold assemblies during rigidification of the product, and to supply tension during the infusion of the rigidification material. Such a kit can be a self-contained pre-assembled kit for producing curved tubular fiber-reinforced polymer composite structural members of any desired curvature.

The embodiments illustrated in FIGS. 12 through 22 relate to the construction of hollow composite construction members having a hollow inner cavity at least partially filled with a secondary structural reinforcing material to form a hybrid composite construction member. As used herein, the term "hybrid composite" is defined as a composite including at least one known composite, such as but not limited to carbon fiber with polymer resin matrix, which is formed as a composite with one or more other materials, such as but not limited to concrete, polymer concrete, Portland cement, and short fiber reinforced polymer concrete.

Figure 12:
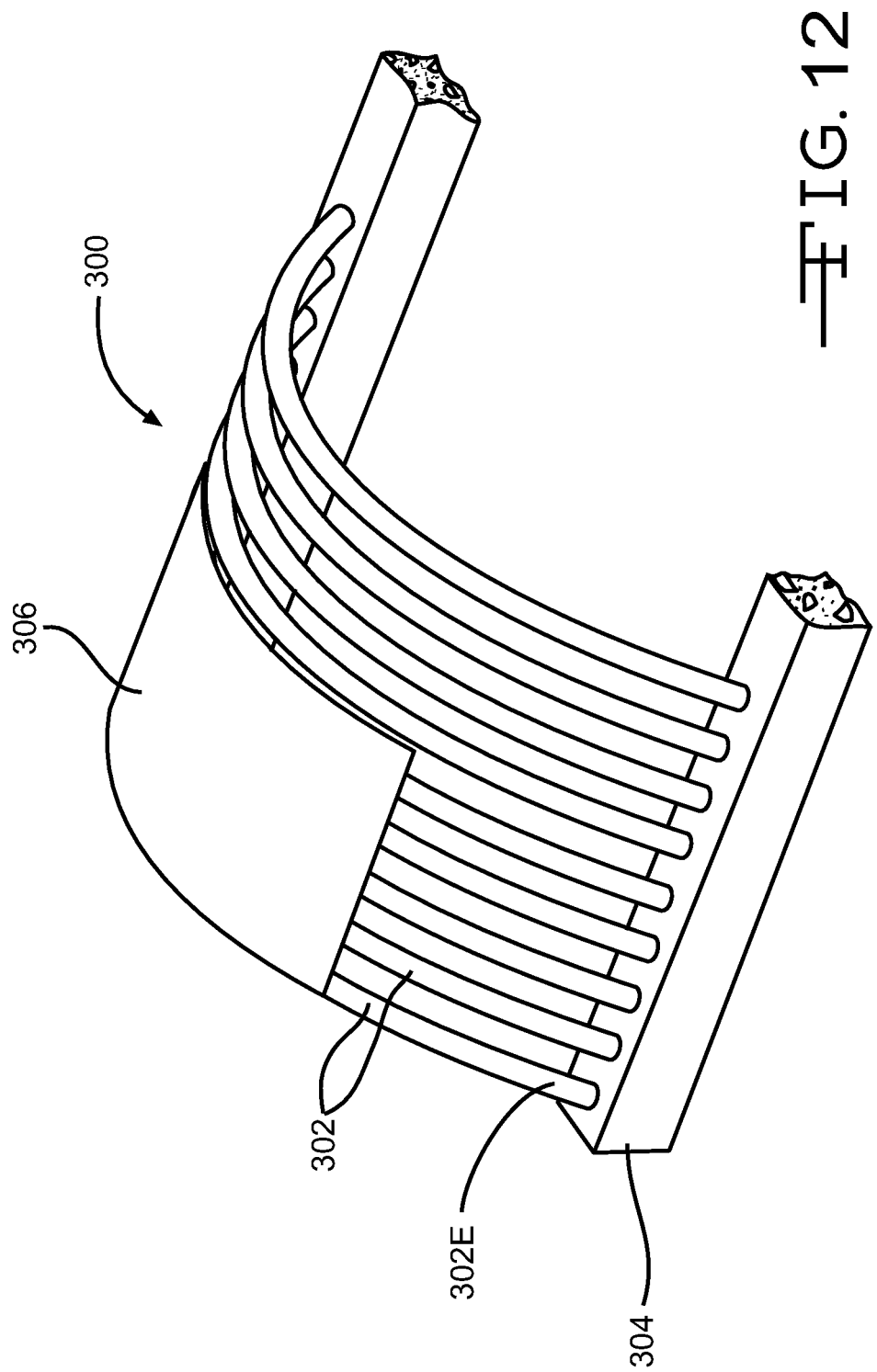
FIG. 12 is a schematic perspective view of a bridge arch formed with hybrid composite construction members according to the invention.

In many applications, such as but not limited to bridge arches, beams, tunnel supports, and building frame components, it is desirable to increase the load capacity and/or stiffness of a primary reinforcement member. Referring to FIG. 12, a portion of a bridge arch is shown at 300. The bridge arch 300 includes a plurality of hybrid composite construction members 302, also shown in FIG. 13. The ends 302E of the hybrid composite construction members 302 are embedded in a concrete footing 304. In the illustrated embodiment, the hybrid composite construction members 302 are covered with decking material, such as composite decking 306.

A hybrid composite construction member 302 includes a primary reinforcement member or hollow composite construction tube 308. The hollow composite construction tube 308 may be any desired and suitably rigid tube, such as the FRP tube 238 described herein above.

The load capacity and/or stiffness of the primary reinforcement member or hollow composite construction tube 308 may be increased by at least partially filling the hollow interior of the tube 308 with a secondary structural reinforcement material 310 such as but not limited to expansive or non shrink concrete, expansive or non shrink grout, polymer concrete, and structural foam.

The load capacity of the hollow composite construction tube 308 may be increased to more than the sum of the separate capacities of the primary and secondary members 308 and 310 in a number of ways. In one example, it is desirable to make the cross-section of the composite construction tube 308 larger to increase the moment of inertia, which increases the net structural cost efficiency of the composite construction tube 308 under high loads. Normally, there is an upper limit to the benefit of increasing this cross-sectional dimension without increasing the wall thickness of a tubular structure, such as the composite construction tube 308. This upper limit exists in tubes where the failure mode changes from material failure to local buckling failure, and is often the result of too high of a diameter to wall thickness ratio. Advantageously, the secondary reinforcement material 310 may be added to restrain local buckling of the wall of the primary reinforcement. In such an embodiment, the maximum diameter to wall thickness ratio is significantly increased, thereby allowing an increase in structural efficiency in the primary reinforcement.

The combination of the primary reinforcement composite construction member or tube 308 and secondary reinforcement material 310 becomes a hybrid composite construction member when there is composite action between the composite construction tube 308 and secondary reinforcement material 310. As is known to one skilled in the art, composite action occurs when there is substantial resistance to slippage between the two materials at their interface, such as the interface 322 between the tube 308 and the secondary structural reinforcement material 310 described below. Hybrid composite construction members 302 are desirable because a properly arranged hybrid composite construction member 302 comprising two or more materials has the potential to offer better mechanical properties than the sum of the mechanical properties of the component parts of the hybrid composite. As composite action is increased, mechanical properties can be further improved, up to the point where complete strain compatibility between the two materials at the interface is achieved. For example, in one non-limiting example, a hybrid composite construction member 302 includes a primary reinforcement or hollow composite construction tube 308 formed from FRP. Such a hollow composite construction tube 308 formed from FRP typically has lower compression strength relative to tension strength. Therefore, in pure bending, combined bending and axial compression loading, and a variety of other loading conditions, its initial failure load is determined by its compression strength. Many commonly selected secondary reinforcements, such as concrete, have lower tension strength than compression strength, so in pure bending, and also a variety of other loading conditions, the failure load of unreinforced concrete is determined by its tension strength. Thus, using the representative but not exclusive example of pure bending, the sum of the pure bending capacities of each of the FRP tubes 308 and the concrete alone are both much lower than the bending capacity and stiffness of the two together in a hybrid composite structure. In such a hybrid composite structure, the secondary reinforcement material 310 (concrete in this example) may augment the compression strength of the FRP tube 308, while the FRP tube 308 also augments the tensile strength of the concrete.

Minimum stiffness is often the governing property for structural design in applications and structural systems such as bridges where there are maximum deflection limits. Again using the representative but not exclusive example of pure bending, the bending stiffness of the hybrid composite construction member 302 is much higher than the sum of the pure bending stiffness of each of the FRP tube 308 and the concrete 310 alone, because of the composite action between the primary and secondary reinforcements 308 and 310, as described above.

There are many other benefits to the hybrid composite construction members 302 described herein over the structurally separate combination of the two members. In order for the primary and secondary reinforcement to work in concert as a single structure however, there must be substantial shear transfer between the two components. Examples of such shear transfer may be observed in the present state of the art in steel rebar reinforced concrete, bonded skins in foam core boat decks, and other applications known in the present state of the art.

In the past, methods to achieve shear transfer in tubular structures filled with concrete have been limited to creating a chemical bond using a layer of adhesive. This approach, while effective, limits the structure to embodiments of the type where a solid section is pre-fabricated, and then a tube-like structure is bonded to the outside surface in a post-process.

In the case where the secondary reinforcement material is cast inside of an FRP structural tube, prior approaches to achieving shear transfer have included: assuming, for load calculations, that no shear transfer occurs, using weak secondary bonding directly between the two materials to gain some degree of shear transfer, and using studs or rebar placed through the wall of the tubular structure. For example, in some secondary reinforcement materials, such as concrete, polymer concrete, and cured in place foam, at least some shear transfer is achieved through some degree of chemical bonding during the curing process for the secondary reinforcement material, which can be somewhat beneficial to structural efficiency. Testing has shown however, that chemical bonding can be insufficient to provide enduring composite action with which to develop the maximum bending strength, stiffness, and fatigue potential of the hybrid composite construction member 302, described herein.

Unfortunately, each of these shear transfer approaches often results in significant fabrication disadvantages and/or provides less than ideal shear transfer. The benefits of shear transfer have been largely unavailable in concert with the unique benefits achievable in systems where the secondary reinforcement material is cast in place inside an existing tubular FRP structure. Known reinforced FRP tubes have therefore not taken full advantage of the composite action phenomenon.

Figure 15:
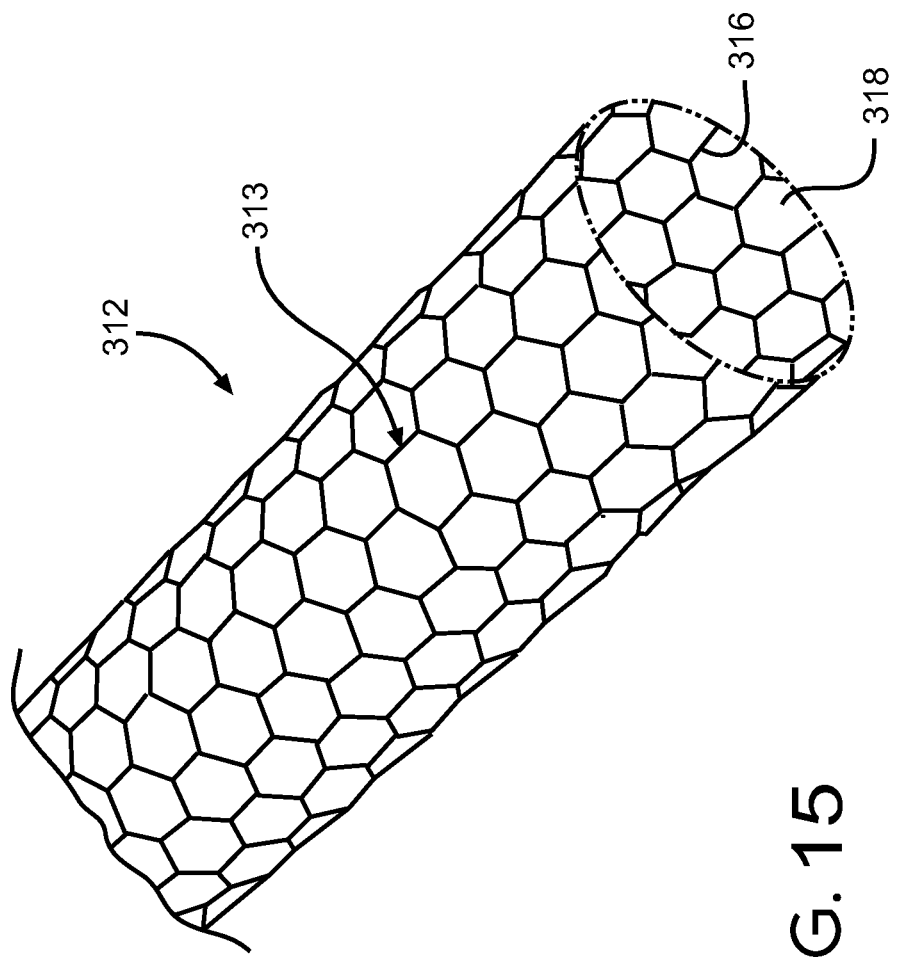
FIG. 15 is a perspective view of a portion of a first embodiment of the shear transfer layer illustrated in FIGS. 14A and 14B, with the rest of the hybrid composite construction member removed.

Referring now to FIG. 13 through 15, a first embodiment of a hybrid composite construction member is shown at 302. FIG. 14A is a first cross-sectional view of the hollow composite construction tube 308, shown with the secondary reinforcement 310 removed for clarity. FIG. 14B is the same cross-sectional view of the hollow composite construction tube 308 shown in FIG. 14A, but shown with the secondary reinforcement material, in this case concrete 310, within the tube 308.

In the embodiment illustrated in FIGS. 14A and 14B, an intermediate or shear transfer member or layer 312 is shown within the tube 308 either bonded to or cast into the inside surface 314 of the tube 308. The secondary structural reinforcement material 310 may then be inserted within the tube 308 to partially or completely fill the tube 308.

To form the tube 308 with the shear transfer layer 312, the shear transfer layer 312 may be inserted into a mold assembly, such as the mold assembly 202, between the bladder 204 and the fabric layer 206. After the fabric layer 206 is infused with the rigidification material 232, and the rigidification material 232 hardens, the shear transfer layer 312 becomes bonded to the inside surface 314 of the tube 308, as shown in FIGS. 14A and 14B.

A first embodiment of the shear transfer layer 312 is shown in FIG. 15. The illustrated shear transfer layer 312 is a flexible, substantially tubular member formed from a suitable material, such as but not limited to polyethylene, polyester, and polyoxymethylene. The illustrated shear transfer layer 312 includes a body formed as an array of elongated members 316 and spaces 318 between the elongated members 316. In the illustrated embodiment, the shear transfer layer 312 defines a repeating pattern of hexagons 313. When bonded to the inside surface 314 of the tube 308, and when viewed in transverse section such as shown in FIGS. 14A and 14B, the elongated members define a pattern of alternating protrusions 316 and spaces between the protrusions 316, the spaces defining regions 318 of no protrusions. The illustrated protrusions 316 have substantially blunted or rounded radially inwardly facing edges 320. The protrusions 316 extend outwardly and substantially perpendicularly from the inside surface 314, and thus substantially perpendicularly to the direction of the anticipated shear forces at the interface 322 between the tube 308 and the secondary structural reinforcement material 310. It will be understood that the shear transfer layer 312 may comprise a repeating pattern or irregular array of any desired geometric shape or combination of shapes. Advantageously, the protrusions 316 and regions 318 of no protrusions define perturbations of the otherwise relatively smooth inside surface 314 of the composite construction tube 308. The perturbations 316 and 318 have sufficient strength, stiffness, and proximity to substantially restrain in-plane relative motion between the primary and secondary reinforcements 308 and 310 at their interface.

It will be also understood that the relative proportion of protrusions 316 to regions 318 of no protrusions will be determined based on known physical properties of the materials interacting at the interface 322; i.e., the known physical properties of the tube 308 and the secondary structural reinforcement material 310.

Figure 16:
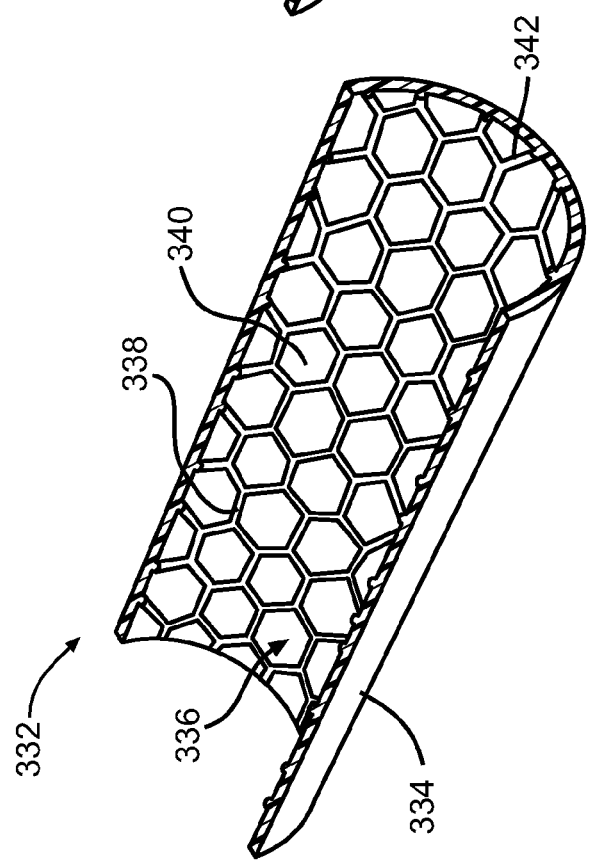
FIG. 16 is a perspective cross-sectional view of a second embodiment of a hybrid composite construction member.

Referring now to FIG. 16, a portion of a second embodiment of the hybrid composite construction member is shown at 332. The construction member 332 is substantially similar to the construction member 302 and includes a hollow composite construction tube 334 having an inside surface 336. The inside surface 336 includes a pattern of alternating protrusions 338 and regions 340 of no protrusions. The illustrated protrusions 338 have substantially blunted or rounded inwardly facing edges 342. The protrusions 338 need not be blunted to promote shear transfer, but by being blunted, the protrusions 338 offer protection against cracking of the secondary reinforcement material 310, particularly under fatigue loading. The protrusions 338 extend outwardly and substantially perpendicularly from the inside surface 336. In the illustrated embodiment, the protrusions 338 formed on the inside surface 336 comprise a repeating pattern of diamonds. It will be understood that the protrusions 338 may comprise a repeating pattern or irregular array of any desired geometric shape or combination of shapes.

Referring now to FIG. 18, a portion of a first alternate embodiment of the mold assembly is shown at 402. To form the tube 334, an array, or repeating pattern of diamonds or other geometric shapes may be formed as grooves 346 in the outer surface 348 of an alternate embodiment of the bladder 344, as best shown in FIG. 18. It will be understood that the grooves 346 may comprise a repeating pattern or irregular array of any desired geometric shape or combination of shapes. After the fabric layer 206 is infused with the rigidification material 232, and the rigidification material 232 fills the grooves 346 and hardens, the repeating pattern of diamonds is formed into the inside surface 336 of the tube 334, as shown in FIG. 16.

Figure 17:
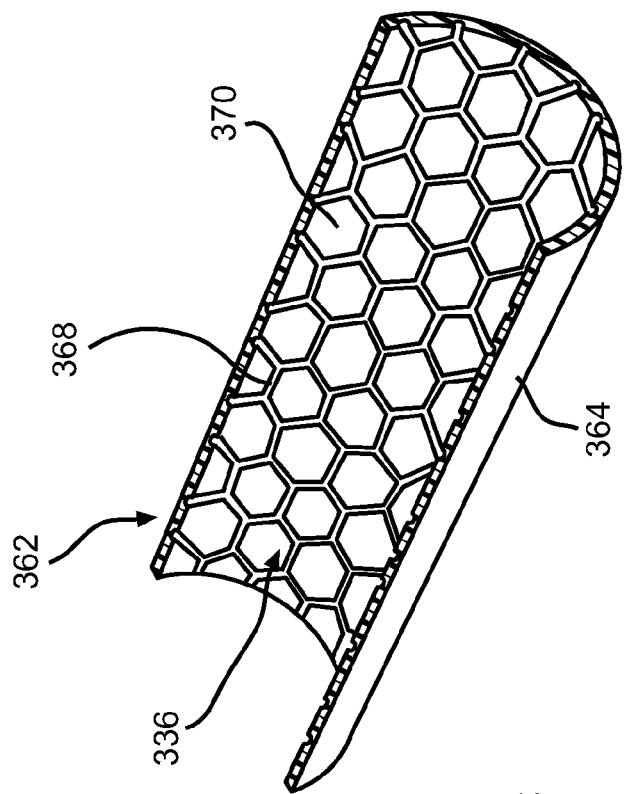
FIG. 17 is a perspective cross-sectional view of a third embodiment of a hybrid composite construction member.

Referring now to FIGS. 17 and 19, a portion of a third embodiment of the hybrid composite construction member is shown at 362. The construction member 362 includes a hollow composite construction tube 364 having an inside surface 366. The inside surface 366 includes a pattern of alternating grooves 368 and regions 370 of no grooves. In the illustrated embodiment, the grooves 368 formed in the inside surface 366 comprise a repeating pattern of diamonds. It will be understood that the grooves 368 may comprise a repeating pattern or irregular array of any desired geometric shape or combination of shapes.

Referring now to FIG. 19, a portion of a second alternate embodiment of the mold assembly is shown at 502. The mold assembly 502 is shown prior to the infusion of the rigidification material 232. To form the tube 364, the repeating pattern 349 of diamonds or other geometric or irregular shapes may be formed as raised members or ribs 350 formed onto the outer surface 352 of an alternate embodiment of the bladder 354, as best shown in FIG. 19. After the fabric layer 206 is infused with the rigidification material 232, the rigidification material 232 hardens around the ribs 350, and the grooves 368 having a repeating diamond pattern are formed into the inside surface 366 of the tube 362, as shown in FIG. 17. It will be understood that the pattern 349 is shown as a regular repeating pattern, but the pattern 349 is not required to be a regular or repeating pattern to function as described herein. When the rigidification material 232 hardens and the bladder 354 is removed, the repeating pattern of diamonds is formed into the inside surface 366 of the tube 364, as shown in FIG. 17.

Referring now to FIG. 20, a portion of a third alternate embodiment of the mold assembly is shown at 602 prior to the fabric layer 206 being infused with the rigidification material 232. The mold assembly 602 may also be used to form the tube 364. To form the tube 364, a mold pattern member 374 may be inserted into the mold assembly 602 between the bladder 204 and the fabric layer 206, as shown in FIG. 20. The illustrated mold pattern member 374 is a flexible tubular member formed from a suitable material, such as polyethylene, polyester, and polyoxymethylene.

The illustrated mold pattern member 374 includes a body formed as an array of elongated members 378 and spaces 380 between the elongated members 378. The mold pattern member 374 may define a repeating pattern or irregular array of any desired geometric or non-geometric shape or combination of shapes. When urged against the bladder 204, the elongated members define a pattern of alternating protrusions 378 and spaces between the protrusions 378, the spaces defining regions 380 of no protrusions.

As the fabric layer 206 is infused with the rigidification material 232, a vacuum (indicated by the arrow V in FIG. 22) may be applied to the interstitial space 226 through the opening 220, as shown in FIG. 3. Atmospheric pressure within the interior cavity 201 (indicated by the arrow A in FIG. 22) acts on the interior wall 207 of the bladder 204.

The vacuum V and atmospheric pressure A urges the bladder 204 radially outwardly against the mold pattern member 374. After the fabric layer 206 is infused with the rigidification material 232, and the rigidification material 232 hardens, the mold pattern member 374 may be removed. As best shown in FIG. 21, the inside surface 372 of the fabric layer 206 (now infused with rigidification material and defining the tube 364) includes the pattern of alternating grooves 368 formed by the protrusion 378 and the regions 380 of no protrusions of the mold pattern member 374. As shown in FIG. 21, radially inwardly extending protrusions 369 are defined between the grooves 368 on the inside surface 372 of the tube 364.

The mold pattern member 374 may be formed of a material to which the FRP resin or rigidification material 232 does not bond, thereby allowing the mold pattern member 374 to be removed from the inside surface 372 after the resin 232 rigidifies.

Alternatively, the mold pattern member 374 may remain bonded to the rigidification material 232 and the fabric layer 206, as shown in FIG. 22. As shown in FIG. 22, the vacuum V and atmospheric pressure A urges the bladder 204 radially outwardly against the mold pattern member 374. The elongated members 378 define an array or pattern of ridges. Depressions 379 are formed on the inside surface 372 of the fabric layer 206 when the bladder 204 is urged into the regions 380 of no protrusions.

In the embodiments of the hybrid composite construction members 302, 332, and 362 described above, a shear transfer promoting texture has been applied to the inside surface 314, 334, and 364 of the hollow composite construction tube 308, 336, and 366, respectively. Such a shear transfer promoting texture allows more highly developed composite action between the primary reinforcement (i.e., the hollow composite construction tubes 308, 336, and 366, respectively) and the secondary reinforcement (i.e., the reinforcement material 310), relative to known composite construction tubes. The more highly developed composite action between the primary reinforcement and the secondary reinforcement causes higher structural efficiency, and can promote longer fatigue life by preventing wear or fretting at the interface between the primary reinforcement and the secondary reinforcement. By adding the shear transfer promoting texture to an already functional hybrid combination of composite materials, a hybrid composite may be created. In this hybrid composite, maximum bending capacity before initial damage occurs may be increased, the ultimate load capacity may be increased, and in some applications, the long term durability of the hybrid composite construction member 302 may be improved.

Advantageously, the addition of texture to the inside surface 314, 334, and 364 of the hollow composite construction tubes 308, 336, and 366, respectively, will provide increased strength. A further advantage of the embodiments of the composite construction members described herein is that the illustrated composite construction members provide a regular pattern of alternating regions of protrusion and no protrusion with substantially blunted edges on the extremity of the protruding ridges. These blunted protrusions 338 offer protection against cracking of the secondary reinforcement material 310, particularly under fatigue loading.

It will be understood that the percentage of the area of the inside surface 314, 334, and 364 of the hollow composite construction tube 308, 336, and 366, respectively, that is dedicated to protrusions, and the magnitude of the protrusions will depend on the materials interacting at the interface.

The principle and mode of operation of the composite construction members and methods of making such composite construction members have been described in its various embodiments. However, it should be noted that the composite construction members and methods of making such composite construction members described herein may be practiced otherwise than as specifically illustrated and described without departing from its scope.

What is claimed is:

1. An inflatable mold assembly for forming a hollow composite construction member suitable for use as a building material, the mold assembly having a longitudinal axis, and further having:
   a flexible, substantially tubular bladder wall defining an elongated inflatable cavity;
   reinforcing fabric positioned concentrically around the flexible bladder wall;
   a flexible air-impervious tubular membrane positioned concentrically around the fabric, with the bladder wall and the outer layer defining an elongated annular space, with the fabric being positioned within the space; and
   a shear transfer layer positioned concentrically within the elongated annular space between the reinforcing fabric and the tubular bladder.

2. The inflatable mold assembly of claim 1 in which the mold is structured to be bent into a curved shape after inflation to any one of many different curvatures, and in which the fabric is structured so that when tension is applied to the fabric before bending the mold, the fibers of the fabric will remain in tension even after the mold is bent into the curved shape.

3. The inflatable mold assembly of claim 1 in which the fabric comprises a plurality of fibers, some of which are oriented in an off-hoop direction that is at an angle greater than or equal to 30 degrees to the hoop direction, and in which the fabric is structured so that when tension is applied to the fabric, the off-hoop direction fibers are prevented from buckling when curvature is applied to the mold assembly resulting in superior structural properties relative to fabric to which tensioning was not applied.

4. The inflatable mold assembly of claim 1 in which the elongated inflatable mold includes a mechanical grip at each end, with the mechanical grips being connected to the fabric and being configured to apply tension to the fabric.

5. The inflatable mold assembly of claim 1 in which the elongated inflatable cavity, when inflated, has a cross-sectional dimension that varies along the longitudinal axis of the elongated inflatable mold.

6. The inflatable mold assembly of claim 1 including a gripping system at each end of the elongated inflatable mold.

7. The inflatable mold assembly of claim 6 including a vacuum inlet positioned outside of the gripping systems.

8. A hollow composite construction member suitable for use as a building material comprising:
   an arched tubular primary reinforcement member having a hollow interior and formed from a fiber reinforced polymer;
   a flexible, tubular shear transfer member bonded to an inside surface of the arched tubular primary reinforcement member; and
   a secondary reinforcement material different from the fiber reinforced polymer and at least partially filling the hollow interior of the tubular primary reinforcement member.

9. The hollow composite construction member of claim 8 wherein the secondary reinforcement material is selected from the group consisting of non-shrink concrete, expansive concrete, non-shrink grout, expansive grout, foam, and sand.

10. The hollow composite construction member according to claim 8, wherein the shear transfer member includes a body formed as an array of elongated members and spaces between the elongated members.

11. The hollow composite construction member according to claim 10, wherein the array of elongated members and spaces define a repeating pattern of geometric shapes.

12. The hollow composite construction member according to claim 10, wherein the array of elongated members and spaces define an irregular array of dissimilar shapes.

13. The hollow composite construction member according to claim 10, wherein radially inwardly facing surfaces of the elongated members have a rounded shape.

14. The hollow composite construction member according to claim 8, wherein the shear transfer member is formed from one of polyethylene, polyester, and polyoxymethylene.

15. A hollow composite construction member suitable for use as a building material comprising:
 an arched tubular primary reinforcement member having a hollow interior and formed from a fiber reinforced polymer, wherein one of an array of grooves and ridges is formed on an inside surface of the tubular primary reinforcement member, the array defining a shear transfer member; and
 a secondary reinforcement material different from the first material and at least partially filling the hollow interior of the tubular primary reinforcement member.

16. The hollow composite construction member of claim 15 wherein the secondary reinforcement material is selected from the group consisting of non-shrink concrete, expansive concrete, non-shrink grout, expansive grout, foam, and sand.

17. The hollow composite construction member according to claim 15, wherein the one of an array of grooves and spaces ridges define a repeating pattern of geometric shapes.

18. The hollow composite construction member according to claim 15, wherein the one of an array of grooves and ridges define an irregular array of dissimilar shapes.

19. The inflatable mold assembly of claim 1 wherein the intermediate shear transfer layer positioned concentrically within the elongated annular space between the reinforcing fabric and the tubular bladder comprises a layer having a pattern of alternating protrusions with spaces between the protrusions.

20. The inflatable mold assembly of claim 19 wherein the pattern of alternating protrusions with spaces between the protrusions forms a pattern of repeating hexagons.

21. The hollow composite construction member according to claim 8 wherein the flexible, tubular shear transfer member extends a substantial portion of a length of the arched tubular primary reinforcement member.

22. The hollow composite construction member according to claim 15, wherein the array of grooves includes a pattern of elongated grooves extending radially into the inside surface of the tubular primary reinforcement member; and
 wherein the array of ridges includes a pattern of elongated protrusions extending radially from of the inside surface and into the hollow interior of the arched tubular primary reinforcement member.

23. The hollow composite construction member according to claim 22 wherein the one of an array of grooves and ridges extends a substantial portion of a length of the arched tubular primary reinforcement member.

24. The hollow composite construction member according to claim 15 wherein the one of an array of grooves and ridges extends a substantial portion of a length of the arched tubular primary reinforcement member.

25. The hollow composite construction member according to claim 8 wherein fibers of the fiber reinforced polymer are aligned such that wrinkling and buckling of the fibers is substantially eliminated.

26. The hollow composite construction member according to claim 15 wherein fibers of the fiber reinforced polymer are aligned such that wrinkling and buckling of the fibers is substantially eliminated.

\* \* \* \* \*

UNITED STATES PATENT AND TRADEMARK OFFICE
CERTIFICATE OF CORRECTION

PATENT NO. : 8,935,888 B2  
APPLICATION NO. : 14/016780  
DATED : January 20, 2015  
INVENTOR(S) : Habib J. Dagher and Richard F. Nye Page 1 of 1

It is certified that error appears in the above-identified patent and that said Letters Patent is hereby corrected as shown below:

In the Claims

Column 17, Claim 17, Line 35, delete "spaces".

Signed and Sealed this
Fourteenth Day of April, 2015

Michelle K. Lee
*Director of the United States Patent and Trademark Office*